United States Patent [19]

Pritchett

[11] Patent Number: 5,695,812
[45] Date of Patent: Dec. 9, 1997

[54] METHOD FOR ABATING BIO-HAZARDOUS MATERIALS FOUND IN COATINGS

[76] Inventor: Joseph E. Pritchett, 6459 Universal Ave., Kansas City, Mo. 64120

[21] Appl. No.: 677,558

[22] Filed: Jul. 8, 1996

[51] Int. Cl.[6] .................................................. B32B 35/00
[52] U.S. Cl. .................. 427/140; 427/385.5; 427/407.1; 427/421; 427/428; 427/429
[58] Field of Search ........................ 427/140, 385.5, 427/407.1, 421, 428, 429

[56] References Cited

U.S. PATENT DOCUMENTS

| | | | |
|---|---|---|---|
| 3,870,550 | 3/1975 | Mann | 117/84 |
| 3,900,611 | 8/1975 | Corbett et al. | 427/214 |
| 4,067,840 | 1/1978 | Wolf | 260/29.6 R |
| 4,112,191 | 9/1978 | Anderson | 428/497 |
| 4,748,051 | 5/1988 | Songer et al. | 427/212 |
| 5,466,489 | 11/1995 | Stahl | 427/421 |
| 5,478,604 | 12/1995 | Leeper | 427/397.8 |

FOREIGN PATENT DOCUMENTS

| | | |
|---|---|---|
| 61-162567 | 7/1986 | Japan. |
| 62-260071 | 11/1987 | Japan. |

*Primary Examiner*—Bernard Pianalto
*Attorney, Agent, or Firm*—Richard C. Litman

[57] ABSTRACT

The abatement of bio-hazardous particulate materials, such as asbestos, has a high priority for providing children with a future. The method of the present invention involves abating such materials by encapsulating them in a simple and effective manner. The method uses a special formulation that when applied to a potentially bio-hazardous surface, such a coating on a substrate, seeps into the pores of the surface, encircles and encapsulates the particles. The formulation also bonds the encapsulated particles to the surface of the substrate carrying the coating. The results of the method are complete encapsulation of potentially bio-hazardous particulate matter found in a coating on a substrate, bonding of the encapsulated particles to the surface of the substrate, and finally, the sealed coating is resistant to impact and abrasion.

12 Claims, No Drawings

METHOD FOR ABATING BIO-HAZARDOUS MATERIALS FOUND IN COATINGS

BACKGROUND OF THE INVENTION

1. Field of the Invention

The present invention relates to a method for encapsulating, with a impact and abrasion resistant formulation, bio-hazardous particulate matter, such as asbestos, lead, and metallic oxides.

2. Description of the Prior Art

Many attempts have been embarked upon for reducing the health hazards of particulate materials found in and around building structures. Specifically, the presence of asbestos, lead, and rust, to name a few, have been found to be extremely dangerous to small children. The small children generally do not realize the health and bio-hazards associated with the ingestion or inhalation of the particles of these materials. Most often, these small children in an inquisitive mindset will eat flaking asbestos, peeling paint and other items. The end results are not favorable to the children, their parents, and society as a whole. In recent years, a number of patents have issued offering remedies to this problem affecting children. For instance, U.S. Pat. No. 3,870,550, issued Mar. 11, 1975 to Mann, discloses a method of preventing the ingestion of lead based paints by applying a bitter tasting solution to the paint, so that the mere taste will discourage children from eating at the eventual paint chips. U.S. Pat. No. 3,900,611, issued Aug. 19, 1975 to Corbett et al., discloses a applied solution of a surfactant and a polymer for reducing dust particulate matter from becoming airborne. U.S. Pat. No. 4,067,840, issued Jan. 10, 1978 to Wolf, discloses a chromogen in the form of microcapsules that upon mastication or ingestion, will change colors signaling that the chromogen has been masticated or ingested. U.S. Pat. No. 4,112,191, issued Sep. 5, 1978 to Anderson discloses a digestible coating for lead based paint coatings form of certain metallic salts the when simultaneously ingested with the lead based paint, will precipitate the lead in an insoluble and indigestible form. U.S. Pat. No. 4,748,051, issued May 31, 1988 to Songer et al., discloses removing the bulk of hazardous material for an area and subsequently coating with a latex type material that produces a tacky films on drying. U.S. Pat. No. 5,466,489, issued Nov. 14, 1985 to Stahl, discloses a method of coating in-situ lead based paints and asbestos with an environmental encasement. U.S. Pat. No. 5,478,604, issued Dec. 26,1995 to Leeper, discloses a coating for lead based paint for reducing the digestion and absorption of lead from the intestinal tract. Japan Patent Document No. 61-162,604, published Jul. 23, 1986 to Iwato, discloses a multiple coating compositions for producing smooth laminated finishes. Japan Patent Document No. 62-260,071, published Nov. 12, 1987 to Suzuki et al., discloses a process for treating the surfaces of tin or tin alloy plated materials.

None of the above inventions and patents, taken either singly or in combination, is seen to describe the instant invention as claimed. More specifically, it is noted that the aforementioned prior art references do not provide any resistance to impact or abrasion, which would prevent the particulate materials from becoming health hazards.

SUMMARY OF THE INVENTION

For many years, children have been victimized by the use of cost effective materials for various purposes. Specifically, school buildings and structures have been fireproofed with asbestos; finishes have routinely used lead based paints; and playground equipment has been constructed with less than adequate rust protecting coatings. The results are devastating; children are subjected to contracting tetanus, lead poisoning, blood disorders, and even cancer from their environment because of the numerous bio-hazardous materials they come into contact.

Accordingly, it is a principal object of the invention to provide a method for abating bio-hazardous materials.

It is another object of the invention to provide a method for abating bio-hazardous materials sealing the pre-existing bio-hazardous materials before they loose to the environment.

It is a further object of the invention to provide a method for abating bio-hazardous materials sealing the pre-existing bio-hazardous materials before they loose to the environment by encapsulating the hazardous material.

Still another object of the invention is to provide a method for abating bio-hazardous materials sealing the pre-existing bio-hazardous materials before they loose to the environment by encapsulating the hazardous material using composition of urethanes and metallics.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification.

DETAILED DESCRIPTION OF THE PREFERRED EMBODIMENT

The present invention is primarily focussed on the abatement of asbestos. However, the general application of this method is not solely limited to the abatement of asbestos, rather to any material that potentially presents a bio-hazard to the environment. Other bio-hazards abated by this method include, but are not limited to, lead particles found in lead based paints, and metallic oxides such as rust.

The present method uses a one part, moisture-curing, aromatic polyurethane composition containing metallics and additional trade secret additives that improve the encapsulating properties. The composition is commercially available from Superior Products International II, Inc., 6459 Universal Avenue, Kansas City, Mo. 64120, under the product name RUST GRIP. RUST GRIP is a unique blend of a diphenyl methane diisocyanate-based polyurethane containing proprietary additives and metallics. This unique blend includes 15–40% by weight aromatic solvents, 5–10% mineral spirits, 3–7% prepolymer diphenyl methane diisocyanate, 3–7% 4,4 diphenyl methane diisocyanate, 10–30% aluminum, and 15–40% by weight isocyanate catalyzed polyurethane. The resulting formulation provides an impact and abrasive resistant finish over existing coatings that contain hazardous materials.

The method of the present invention uses this formulation of a combination of high performance urethanes and additives in a single component unit to give the formulation the ability to encapsulate, and seal any surface. Unlike the prior art methods that require the coated surfaces be prepped before applying any sealing or overlay material. The prior art methods require a cleaning, scraping, removing, or the like, of any excess, peeling, or flaking of the previous coating. This procedure allows the hazardous materials, in particulate form, to contaminate the environment. Additionally, this procedure requires further extensive and expensive clean-up to insure environmental security and safety.

The present method does not require the expensive, extensive, and time consuming steps of preparing the coated surfaces. The present method applies the formulation directly to the coated substrate surface. The method applies the formulation in a manner consistent with many other general purpose coatings, however, the method is novel because it produces the new and unexpected result of encircling, encapsulating and bonding otherwise bio-hazardous particulate matter to the substrate surface. The method of the present invention involves providing the formulation set forth above. The application of the formulation involves the simple procedure of coating the surface of the coated substrate. This is accomplished in various conventional manners, such as, brushing, rolling, or spraying. As stated above, it is not necessary to prepare the surface in any extensive manner, however, the method requires that the surface be completely dry. Additionally, a light dust removal or vacuuming may enhance the effectiveness, although not required.

The formulation once initially applied, is allowed time to percolate through the coating and bond to the substrate surface. The formulation percolates through the pores of the coating on the substrate surface. During the percolation, the formulation also expands internally of the pores by absorbing atmospheric moisture. The expansion also provides the vehicle with which the formulation also attaches to the particulate matter that forms the bio-hazard. The attachment virtually causes the formulation to encircle the particulate matter and bond the particulate matter to the substrate surface.

During the percolating of the formulation, the method also allows the formulation to cure for a first period of time not to exceed four hours. The formulation is re-applied, re-percolated, and re-cured at least for one additional application after the initial application. The formulation has a property that once it is allowed to completely dry out, the ability to apply a second coat is lost. The formulation is most effective when at least two complete applications of the formulation are administered. The second or subsequent application is allowed to cure for a time period also not to exceed four hours unless the seconds or subsequent application is the final application.

The final application is allowed to completely cure or dry, generally six to eight hours. Once the final application is completely cured, the formulation forms a encapsulating seal around all particles of the hazardous material, bonds to the substrate surface, and produces a virtually impact resistant shell that maintains integrity exceeding impacts of 200 psi. Further, this shell is also abrasion resistant on the order of 18 mg/kHz loss. The standard protocol generally requires abrasion resistance to be within the range limits of 100–150 mg/kHz, or less to be acceptable.

The bio-hazardous materials of the coating on a substrate is abated and the surface is impact and abrasion resistant. The particulate materials, such as asbestos, is no longer a substantial threat to children, or anyone, during the normal course of use of the substrate. That is, the asbestos particles will not be released as air borne contaminants using applicant's method when the asbestos coated substrate is used in a normal fashion. Likewise, any other potentially bio-hazardous coating (e.g., lead based paint) when encapsulated by the present method is rendered virtually harmless to anyone, particularly children.

It is to be understood that the present invention is not limited to the sole embodiment described above, but encompasses any and all embodiments within the scope of the following claims.

I claim:

1. A method of encapsulating bio-hazardous particulate matter contained in the coating of a coated substrate comprising the steps of:

A: providing an encapsulating formulation including solvent-based urethanes and metallics ;

B: applying the encapsulating formulation to a substrate having a coating including lead particles;

C: percolating the encapsulating formulation through the coating of the substrate such that the encapsulating formulation bonds to the lead particles and to the substrate;

D: curing the formulation for a first predetermined period of time;

E: repeating steps B and C; and

F: re-curing the formulation for a second predetermined length of time;

whereby, upon re-curing, the encapsulating formulation is bonded to the lead particles and the substrate encapsulates and seals the lead particles to the substrate; and forms an impact and abrasion resistant barrier over the coating of the substrate.

2. The method according to claim 1, the first predetermined time period is equal to or less than four hours.

3. The method according to claim 1, said step of applying includes brushing the formulation onto the coated substrate.

4. The method according to claim 1, said step of applying includes rolling the formulation onto the coated substrate.

5. The method according to claim 1, said step of applying includes spraying the formulation onto the coated substrate.

6. The method according to claim 1, wherein said step of percolating includes the steps of:

penetrating pores in the coating and the substrate;

expanding the encapsulating formulation in the pores; and encircling the lead particles in the coating.

7. A method of encapsulating bio-hazardous particulate asbestos matter contained in the coating of a coated substrate comprising the steps of:

A: providing an encapsulating formulation including solvent-based urethanes and metallics;

B: applying the encapsulating formulation to a substrate having a coating including asbestos particles;

C: percolating the encapsulating formulation through the coating of the substrate such that the encapsulating formulation bonds to the asbestos particles and to the substrate;

D: curing the formulation for a first predetermined period of time;

E: repeating steps B and C; and

F: re-curing the formulation for a second predetermined length of time;

whereby, upon re-curing, the encapsulating formulation is bonded to the asbestos particles and the substrate; encapsulates and seals the asbestos particles to the substrate; and forms an impact and abrasion resistant barrier over the coating of the substrate.

8. The method according to claim 7, the first predetermined time period is equal to or less than four hours.

9. The method according to claim 7, wherein said step of percolating includes the steps of:

penetrating pores in the coating and the substrate;

expanding the encapsulating formulation in the pores; and encircling the asbestos particles in the coating.

10. The method according to claim 7, said step of applying includes spraying the formulation onto the coated substrate.

11. The method according to claim 7, said step of applying includes brushing the formulation onto the coated substrate.

12. The method according to claim 7, said step of applying includes rolling the formulation onto the coated substrate.

* * * * *